(12) United States Patent
Lee

(10) Patent No.: US 11,828,629 B2
(45) Date of Patent: Nov. 28, 2023

(54) MULTI-TRACK OPTICAL ENCODER

(71) Applicant: PixArt Imaging (Penang) SDN. BHD., Penang (MY)

(72) Inventor: Sai-Mun Lee, Penang (MY)

(73) Assignee: PIXART IMAGING (PENANG) SDN. BHD., Penang (MY)

( * ) Notice: Subject to any disclaimer, the term of this patent is extended or adjusted under 35 U.S.C. 154(b) by 196 days.

(21) Appl. No.: 17/333,270

(22) Filed: May 28, 2021

(65) Prior Publication Data

US 2022/0381588 A1 Dec. 1, 2022

(51) Int. Cl.
*G01D 5/34* (2006.01)
*G01D 5/347* (2006.01)

(52) U.S. Cl.
CPC .............................. *G01D 5/34707* (2013.01)

(58) Field of Classification Search
CPC .. G01D 5/347; G01D 5/34707; G01D 5/3473; G01D 5/34776
See application file for complete search history.

(56) References Cited

U.S. PATENT DOCUMENTS

2022/0163353 A1\* 5/2022 Shim .................. G01D 5/34792

\* cited by examiner

*Primary Examiner* — Kevin K Pyo
(74) *Attorney, Agent, or Firm* — HAUPTMAN HAM, LLP

(57) ABSTRACT

There is provided an optical encoder including an encoding medium, a substrate, a light source and a light sensor. The encoding medium includes an index track and a position track. The light source is arranged at a first surface of the substrate to emit light toward the index track and the position track. The light sensor is arranged at a second surface of the substrate, and has a first light sensing region and a second light sensing region for receiving reflective light respectively from the index track and the position track.

12 Claims, 2 Drawing Sheets

MULTI-TRACK OPTICAL ENCODER

BACKGROUND

1. Field of the Disclosure

This disclosure generally relates to an optical encoder and, more particularly, to an optical encoder whose light sensor can detect reflective light from different tracks.

2. Description of the Related Art

Please referring to FIG. 1, it is a cross sectional view of a conventional optical encoder 100. The optical encoder 100 includes a light source 111, alight sensor 113 and an encoding medium 12. The encoding medium 12 has a track A and a track B has different transverse distances D1 and D2 from the light source 111.

The light source 111 projects light toward the track A and the track B from one side (shown as left side in FIG. 1) of the encoding medium 12. The track A and the track B are used to modulate light from the light source 111 and to generate reflective light propagating to the light sensor 113. The light sensor 113 generates electric signals for being post-processed by a processor (not show) according to the modulated reflective light being received.

As the track A and the track B have different transverse distances from the light source 111, the modulated reflective light from the track A is significantly stronger than the modulated reflective light from the track B, and this intensity difference introduces difficulty in regulating the emission light intensity of the light source 111.

For example, to ensure the modulated reflective light from the track B to be strong enough, the emission light intensity of the light source 111 is increased that causes the modulated reflective light from the track A is too strong such that photodiodes of the light sensor 113 are saturated. On the contrary, if the modulated reflective light from the track A is regulated to have optimum intensity by decreasing the emission light intensity of the light source 111, the modulated reflective light from the track B is too weak to be detected or too sensitive to noises, e.g., caused by contamination on the encoding medium 12.

Accordingly, the present disclosure further provides an optical encoder that can effectively reduce the intensity difference of modulated reflective light from different tracks.

SUMMARY

The present disclosure provides a reflective optical encoder that eliminates the intensity difference between modulated reflective light from different tracks by arranging a light source between said different tracks.

The present disclosure further provides a reflective optical encoder that reduces the assembling complexity and the thermal effect of a light source by arranging the light source and the light sensor at two opposite sides of a substrate.

The present disclosure provides an optical encoder including an encoding medium, a substrate, a light source and a front-side illuminated (FSI) sensor. The encoding medium includes a first track and a second track. The substrate has a first surface and a second surface opposite to each other, wherein the first surface faces the encoding medium. The light source is arranged at the first surface of the substrate, and located between the first track and the second track. The FSI sensor is arranged at the second surface of the substrate, and having a first light sensing region and a second light sensing region configured to receive reflective light respectively from the first track and the second track.

The present disclosure further provides an optical encoder including an encoding medium, a substrate, a light source and a backside illuminated (BSI) sensor. The encoding medium includes a first track and a second track. The substrate has a first surface and a second surface opposite to each other, wherein the first surface faces the encoding medium. The light source is arranged at the first surface of the substrate, and located between the first track and the second track. The BSI sensor is arranged at the second surface of the substrate, and having a first light sensing region and a second light sensing region configured to receive reflective light respectively from the first track and the second track.

The present disclosure further provides an optical encoder including an encoding medium, a substrate, a first light source, a second light source and a light sensor. The encoding medium includes a first track and a second track. The substrate has a first surface and a second surface opposite to each other, wherein the first surface faces the encoding medium. The first light source and a second light source are arranged at the first surface of the substrate, and emitting light respectively toward the first track and the second track, wherein the first track and the second track are located between the first light source and the second light source. The light sensor is attached to the second surface of the substrate, and having a light sensing region configured to receive reflective light from the first track and the second track.

The present disclosure further provides an optical encoder including a substrate, a light source and a light sensor. The substrate has a through hole, a first surface and a second surface opposite to the first surface. The light source is arranged at the first surface of the substrate. The light sensor is arranged at the second surface of the substrate, and has a first light sensing region and a second light sensing region configured to receive light passing through the through hole.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The optical encoder of the present disclosure is adaptable to a reflective type optical encoder having multiple tracks for balancing reflective light intensity from different tracks. Furthermore, a light source and a light sensor of the present disclosure are arranged at different surfaces of a substrate to prevent interfering to reflective light from emission light of the light source. The optical encoder of the present disclosure can reduce assembling complexity and has lower interference to the chip due to heating of the light source in operation.

Figure 1:
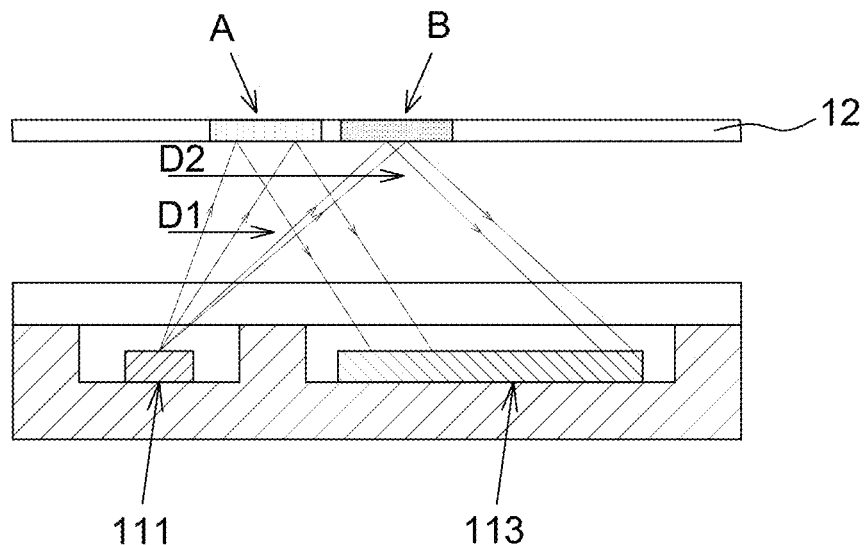
FIG. 1 is a cross sectional view of a conventional optical encoder.
Figure 2:
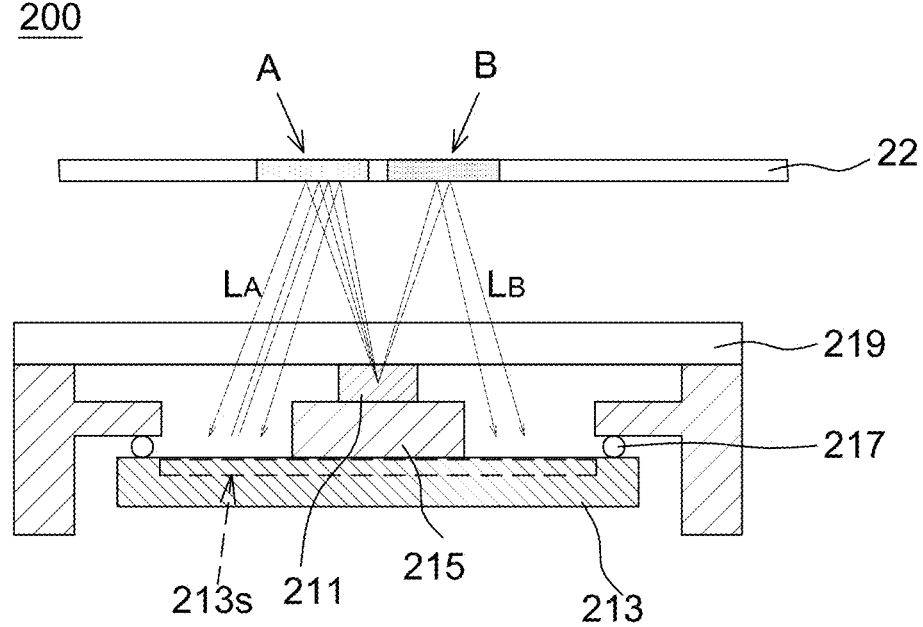
FIG. 2 is a cross sectional view of an optical encoder according to a first embodiment of the present disclosure.

Please referring to FIG. 2, it is a cross sectional view of an optical encoder 200 according to a first embodiment of the present disclosure. The optical encoder 200 includes an encoding medium 22 and a sensing device arranged opposite to each other. The encoding medium 22 is, for example, a code disk or a code strip that rotates or linearly moves with respect to the sensing device depending on different applications.

The encoding medium 22 includes a first track A and a second track B. For example, the first track A is a position track for generating reflective light to determine a current position or angle of the encoding medium 22. For example, the second track B is an index track for determining an absolute position or angle of the encoding medium 22, e.g., an original position or 0 degree. The first track A and the second track B are located at different tracks of the encoding medium 22. For example, when the encoding medium 22 is a code disk, the first track A and the second track B are located at different radial positions. In the present disclosure, a number of and a shape of slits or reflective stripes included in the first track A and the second track B are not particularly limited.

In FIG. 2, the sensing device is referred to a package or a chip under the encoding medium 22. The sensing device includes a substrate 215, a light source 111 and a front side illuminated (FSI) sensor 213, e.g., CMOS image sensor. In some aspects, the sensing device further includes a filter 219 arranged on the substrate 215 (e.g., FIG. 2 showing the filter 219 being attached to the substrate 215 at the edge thereof) to block light outside an emission spectrum of the light source 111 and to protect components in the sensing device.

The substrate 215 is selected from a printed circuit board (PCB), a ceramic substrate or a flexible board without particular limitations. The substrate 215 has a first surface (e.g., an upper surface in FIG. 2) and a second surface (e.g., a lower surface in FIG. 2) opposite to each other, wherein the first surface faces the encoding medium 22. The substrate 215 further includes a first opening and a second opening for the reflective light from the first track A and the second track B to pass through. The shapes of the first opening and the second opening are not particularly limited.

The light source 211 is, for example, a light emitting diode for emitting light of an identifiable spectrum, e.g., red light and/or infrared light. The light source 211 is arranged at the first surface of the substrate 215, and located between the first track A and the second track B. Preferably, the first track A and the second track B are within an emission angle of the light source 211. In this way, the light source 211 illuminates both the first track A and the second track B. Preferably, the light source 211 is located at a center position between (in the transverse direction) the first track A and the second track B so as to uniformly illuminate the first track A and the second track B, but the present disclosure is not limited thereto. In the scenario that the emission angle of the light source 211 has special configuration, the light source 211 is not located at a center between the first track A and the second track B but located at a position that causes the first track A and the second track B to be uniformly illuminated.

An active region (or called light sensing region) 213s of the FSI sensor 213 is located at a side close to the substrate 215, and the FSI sensor 213 is attached to the second surface of the substrate 215 via conductive bumps 217. The method of combining a sensor to a substrate using conductive bumps is known to the art, and thus details thereof are not described herein. In order not to degrade the operation of the active region 213s, the conductive bumps 217 are arranged outside the active region 231s.

The FSI sensor 213 is arranged at the second surface of the substrate 215, and has a first light sensing region (e.g., left part of active region in FIG. 2) and a second light sensing region (e.g., right part of active region in FIG. 2), each having at least one photodiode, respectively for detecting reflective light $L_A$ from the first track A and reflective light $L_B$ from the second track B. In one aspect, the FSI 213 has a single light sensing region 213s (e.g., shown as dashed block), and because a part of the single light sensing region 213s is blocked by the substrate 215, a first light sensing region and a second light sensing region is divided during operation. Meanwhile, the first opening and the second opening of the substrate 215 are respectively aligned with the first light sensing region and the second light sensing region of the FSI sensor 211 to allow the reflective light $L_A$ and $L_B$ respectively from the first track A and the second track B to pass through.

In one aspect, the optical encoder 200 further includes a processor (e.g., MCU or ASIC) to respectively identify the intensity variation detected by the first light sensing region and the second light sensing region to identify the position signal and the index signal generated thereby.

As shown in FIG. 2, as the light source 211 fairly illuminates the first track A and the second track B, the intensity difference between the reflective light $L_A$ and $L_B$ is eliminated such that it is not required to consider the interference caused by the intensity difference in regulating the emission light intensity of the light source 211.

Figure 3:
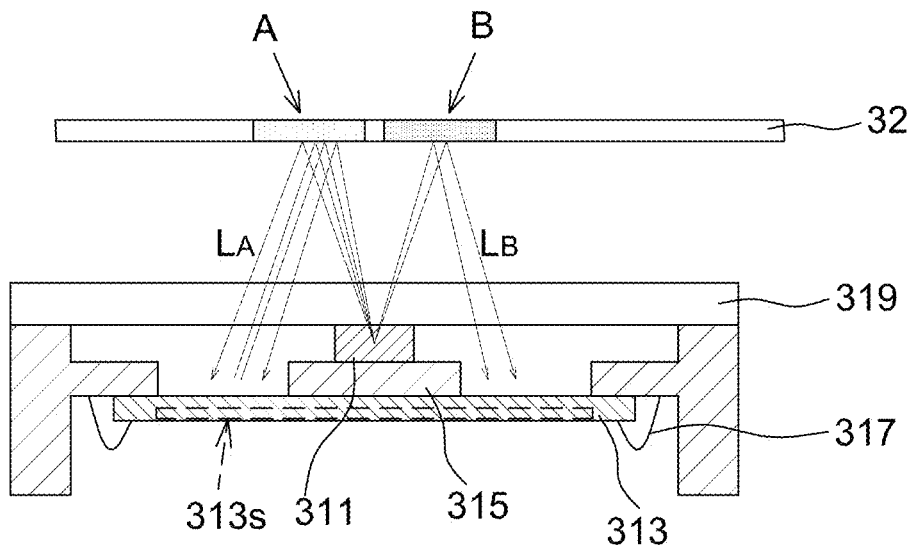
FIG. 3 is a cross sectional view of an optical encoder according to a second embodiment of the present disclosure.

Please referring to FIG. 3, it is a cross sectional view of an optical encoder 300 according to a second embodiment of the present disclosure. The optical encoder 300 also includes an encoding medium 32 and a sensing device arranged opposite to each other. The encoding medium 32 also includes a first track A and a second track B, and the first track A and the second track B are located at different tracks of the encoding medium 32. The difference between the optical encoder 300 and the optical encoder 200 of the first embodiment is that the FSI sensor 213 is replaced by a backside illuminated (BSI) sensor 313, e.g., CMOS image sensor, but other components are identical to the first embodiment.

An active region (e.g., shown by dashed block) 313s of the BSI sensor 313 is located at a side far from the substrate 315. The reflective light $L_A$ and $L_B$ from the first track A and the second track B penetrate into a light sensing region (i.e. the active region) 313s from a back side of the BSI sensor 313. The BSI sensor 313 is attached to the second surface of the substrate 315 via bonding wires 317. The method of combining a light sensor to a substrate using bonding wires is known to the art, and thus details thereof are not described herein.

Similarly, in this embodiment, a part of the light sensing region 313s is blocked by the substrate 315 such that the reflective light $L_A$ and $L_B$ propagates to a first light sensing region (e.g., left part of active region 313s) and a second light sensing region (e.g., right part of active region 313s) of the BSI sensor 313 via a first opening and a second opening of the substrate 315.

In one aspect, the optical encoder 300 includes a processor to respectively identify the intensity variation detected by the first light sensing region and the second light sensing region of the BSI sensor 313 to identify the position signal and the index signal generated thereby. The method of identifying an angle of the encoding medium 32 by a processor according to the position signal (associated with reflective light $L_A$) and the index signal (associated with reflective light $L_B$) is known to the art and not a main objective of the present disclosure, and thus details thereof are not described herein.

The optical encoder 300 also includes a filter 319 for the purpose of light filtering and structure sealing.

Similarly, in the second embodiment of FIG. 3, as the light source 311 uniformly illuminates the first track A and the second track B, the intensity difference between reflective light $L_A$ and $L_B$ is effectively eliminated.

Figure 4:
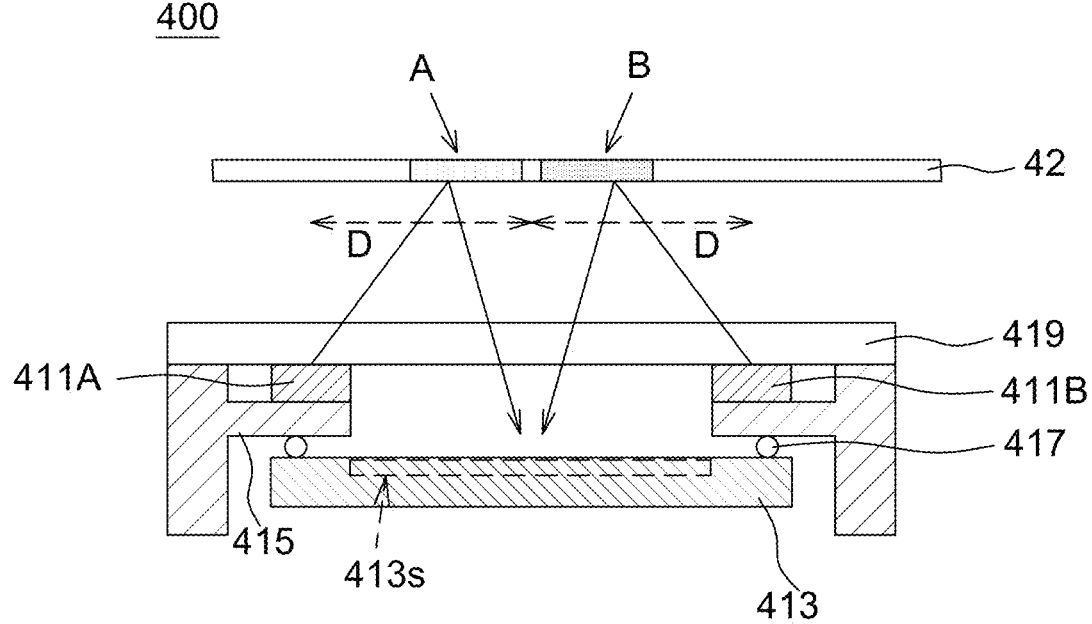
FIG. 4 is a cross sectional view of an optical encoder according to a third embodiment of the present disclosure.

Please referring to FIG. 4, it is a cross sectional view of an optical encoder 400 according to a third embodiment of the present disclosure. The optical encoder 400 also includes an encoding medium 42 and a sensing device arranged opposite to each other. The encoding medium 42 also includes a first track A and a second track B located at different tracks of the encoding medium 32. The encoding medium 42 of the third embodiment is identical to the encoding mediums 22 and 32 in the above first and second embodiments and thus details thereof are not repeated herein.

The sensing device includes a substrate 415, a first light source 411A, a second light source 411B and a light sensor 413. The substrate 415 is also selected from a PCB, a ceramic substrate or a flexible board that has a first surface (e.g., an upper surface in FIG. 4) and a second surface (e.g., a lower surface in FIG. 4) opposite to each other, wherein the first surface faces the encoding medium 42.

The first light source 411A and the second light source 411B are, for example, light emitting diodes, and are used to emit light of an identifiable spectrum, e.g., red light and/or infrared light. The first light source 411A and the second light source 411B are arranged at the first surface of the substrate 415, and emit light respectively toward the first track A and the second track B, wherein the first track A and the second track B are located between (e.g., in a transverse direction of FIG. 4) the first light source 411A and the second light source 411B. Preferably, the first track A is located within an emission angle of the first light source 411A, and the second track B is located with an emission angle of the second light source 411B. Preferably, the first track A and the second track B are symmetrically arranged between the first light source 411A and the second light source 411B. For example, a central line between the first track A and the second track B has the same distance D from the first light source 411A and the second light source 411B.

In FIG. 4, the light sensor 413 is shown as the FSI sensor whose active region (or called light sensing region) 413s is located at a side close to the substrate 415, and the light sensor 413 is attached to the second surface of the substrate 415 using conductive bumps 417, but the present disclosure is not limited thereto. In another aspect, the light sensor 413 is a BSI sensor, similar to that shown in FIG. 3, and said BSI sensor is attached to the second surface of the substrate 415 using bonding wires.

In the third embodiment, the substrate 415 has an opening aligned with the first track A and the second track B as well as the light sensing region 413s of the light sensor 413 such that reflective light from the first track A and the second track B can propagate to the light sensing region 413s via the opening. The first light source 411A and the second light source 411B are preferably arranged at two opposite sides of the opening.

In some aspects, the optical encoder 400 further includes a filter 419 configured for the purpose of light filtering and structure sealing.

Similarly, in the third embodiment of FIG. 4, because the first light source 411A and the second light source 411B uniformly illuminate the first track A and the second track B, the intensity difference between reflective light is effectively eliminated. Preferably, the emission intensity of the first light source 411A and the second light source 411B are substantially identical.

As mentioned above, the optical encoder of the present disclosure includes an encoding medium a substrate, a light source and a light sensor. The substrate includes a through hole, a first surface and a second surface opposite to the first surface. The light source is arranged at the first surface of the substrate. The light sensor is arranged at the second surface of the substrate, and has a first light sensing region and a second light sensing region for receiving light passing through the through hole. The light source of the present disclosure is an FSI sensor or a BSI sensor according to different applications.

It should be mentioned that although the above embodiments of the present disclosure show that the light sensor has a single active region (e.g., shown by dashed block), the present disclosure is not limited thereto. In another aspect, the light sensor of the present disclosure includes two separated active regions respectively for receiving reflective light from different tracks.

As mentioned above, because different tracks in the conventional optical encoder have different transverse distances from a light source, the light intensity reflected from the different tracks and received by a light sensor is also different to make it difficult to determine a suitable emission light intensity of the light source when the emission light intensity of the light source needs to be regulated (e.g., due to distance deviation between the encoding medium and the light source in assembling). Accordingly, the present disclosure further provides an optical encoder (e.g., FIGS. 2-4) that can eliminate the intensity difference of reflective light of different tracks by arranging the light source between said different tracks to balance the reflective light intensity. Furthermore, by arranging the light source and the light sensor at different sides of a substrate, the thermal effect of the light source to the light sensor during operation is prevented and the assembling complexity is reduced. Meanwhile, an additional light blocking wall is no longer necessary between the light source and the light sensor.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical encoder, comprising:
an encoding medium, comprising a first track and a second track;
a substrate, having a first surface and a second surface opposite to each other, wherein the first surface faces the encoding medium;
a light source, arranged at the first surface of the substrate, and located between the first track and the second track; and
a front side illuminated (FSI) sensor, arranged at the second surface of the substrate, and having a first light sensing region and a second light sensing region configured to receive reflective light respectively from the first track and the second track.

2. The optical encoder as claimed in claim 1, wherein the first track is a position track, and the second track is an index track.

3. The optical encoder as claimed in claim 1, wherein the light source is located at a center position between the first track and the second track.

4. The optical encoder as claimed in claim 1, wherein the FSI sensor is attached to the second surface of the substrate via conductive bumps.

5. The optical encoder as claimed in claim 1, wherein a part of a light sensing region of the FSI sensor is blocked by the substrate.

6. The optical encoder as claimed in claim 1, wherein the substrate has a first opening and a second opening respectively aligned with the first light sensing region and the second light sensing region of the FSI sensor.

7. An optical encoder, comprising:
- an encoding medium, comprising a first track and a second track;
- a substrate, having a first surface and a second surface opposite to each other, wherein the first surface faces the encoding medium;
- a light source, arranged at the first surface of the substrate, and located between the first track and the second track; and
- a backside illuminated (BSI) sensor, arranged at the second surface of the substrate, and having a first light sensing region and a second light sensing region configured to receive reflective light respectively from the first track and the second track.

8. The optical encoder as claimed in claim 7, wherein
the first track is a position track, and
the second track is an index track.

9. The optical encoder as claimed in claim 7, wherein the light source is located at a center position between the first track and the second track.

10. The optical encoder as claimed in claim 7, wherein the BSI sensor is attached to the second surface of the substrate via bonding wires.

11. The optical encoder as claimed in claim 7, wherein a part of a light sensing region of the BSI sensor is blocked by the substrate.

12. The optical encoder as claimed in claim 7, wherein the substrate has a first opening and a second opening respectively aligned with the first light sensing region and the second light sensing region of the BSI sensor.

* * * * *